United States Patent [19]
Oprins

[11] 3,763,723
[45] Oct. 9, 1973

[54] WIRE STRIPPER
[75] Inventor: Johannes A. E. Oprins, Sycamore, Ill.
[73] Assignee: Ideal Industries, Inc., Sycamore, Ill.
[22] Filed: Oct. 7, 1970
[21] Appl. No.: 78,796

[52] U.S. Cl............................................. 81/9.5 A
[51] Int. Cl. ............................................ H02q 1/12
[58] Field of Search....................... 81/9.5 A, 9.5 R, 81/9.51

[56] References Cited
UNITED STATES PATENTS
1,666,277   4/1928   White ................................... 81/9.51
2,601,797   7/1952   Holt, Jr............................... 81/9.5 A
2,735,320   2/1956   Green .................................. 81/9.5 A
3,125,908   3/1964   Rozmus ............................... 81/9.5 A
3,422,708   1/1969   Bieganski............................ 81/9.5 A
3,176,550   4/1965   Marcotte ............................. 81/9.51

Primary Examiner—James L. Jones, Jr.
Assistant Examiner—Roscoe V. Parker, Jr.
Attorney—Parker, Carter & Markey

[57] ABSTRACT

This is a wire stripper of the so-called pistol-grip type and is concerned with removing the insulation from wire by a linear or straight-line motion so that the wire itself will not be flexed or arched or nicked as the slug of insulation is removed.

7 Claims, 9 Drawing Figures

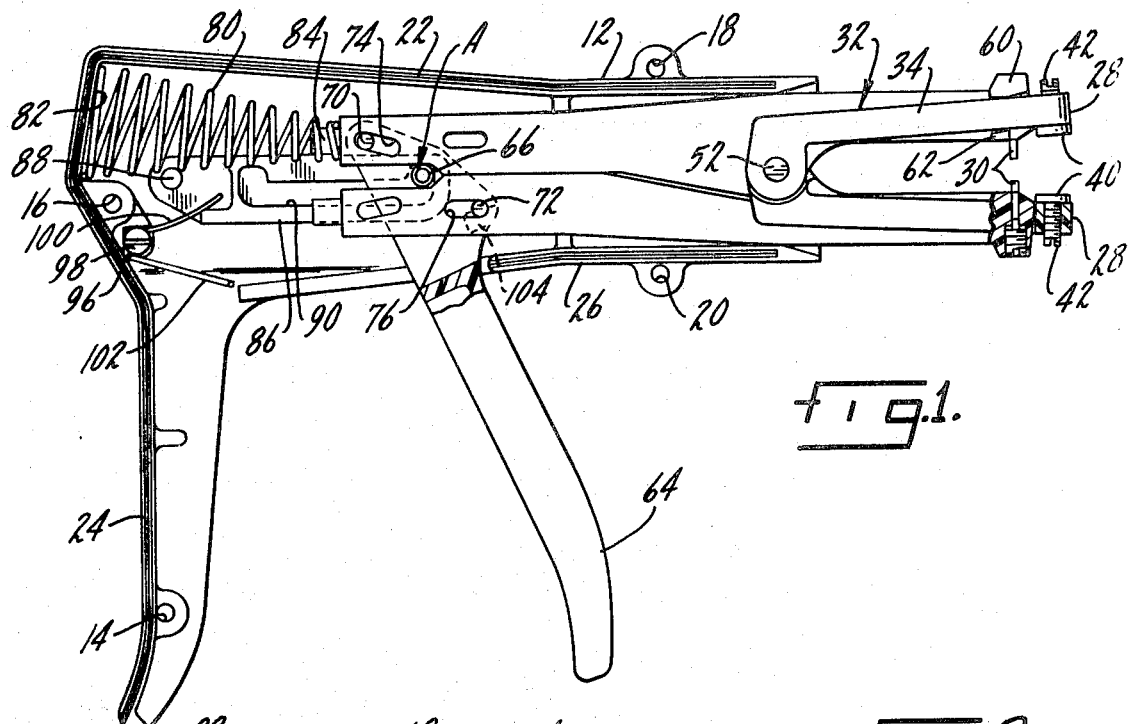
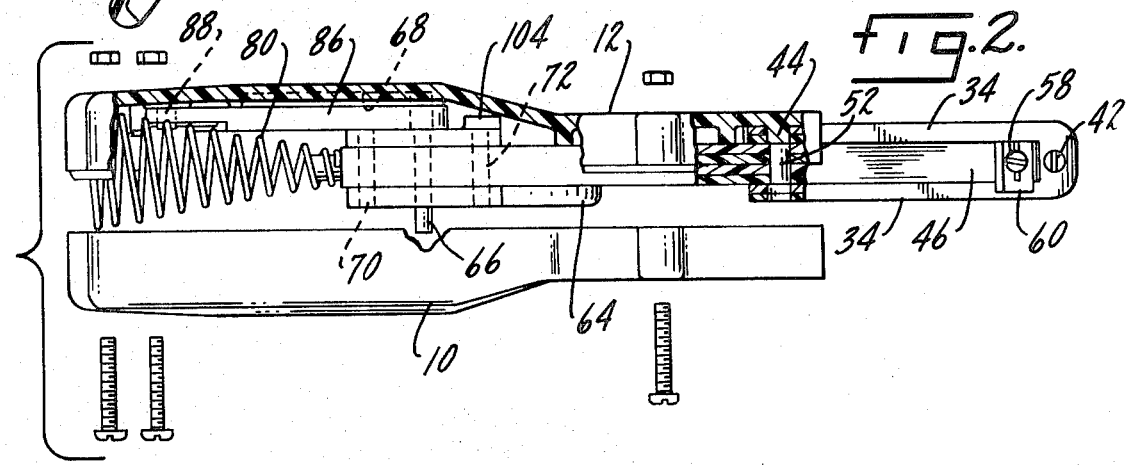
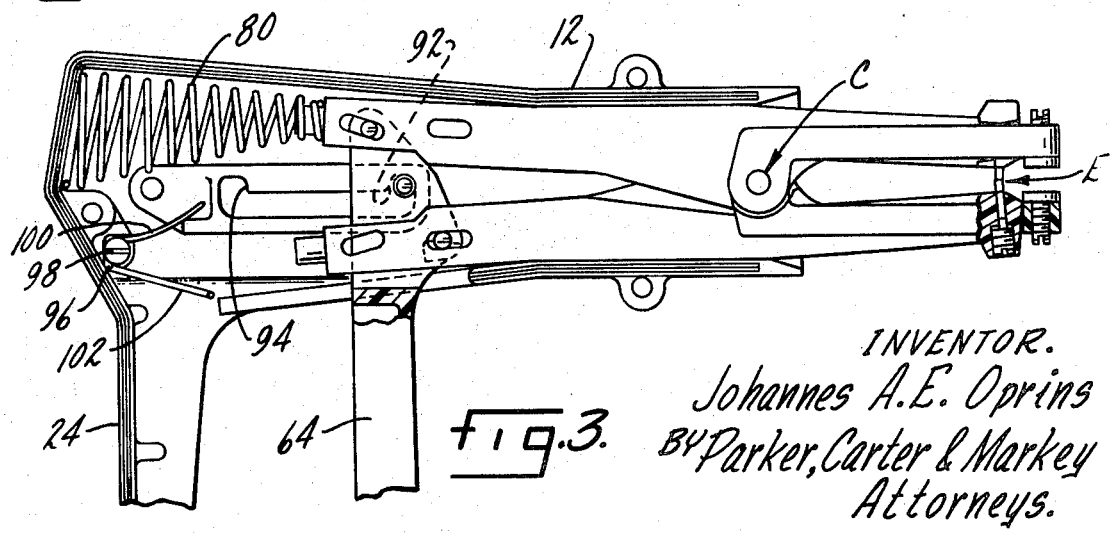

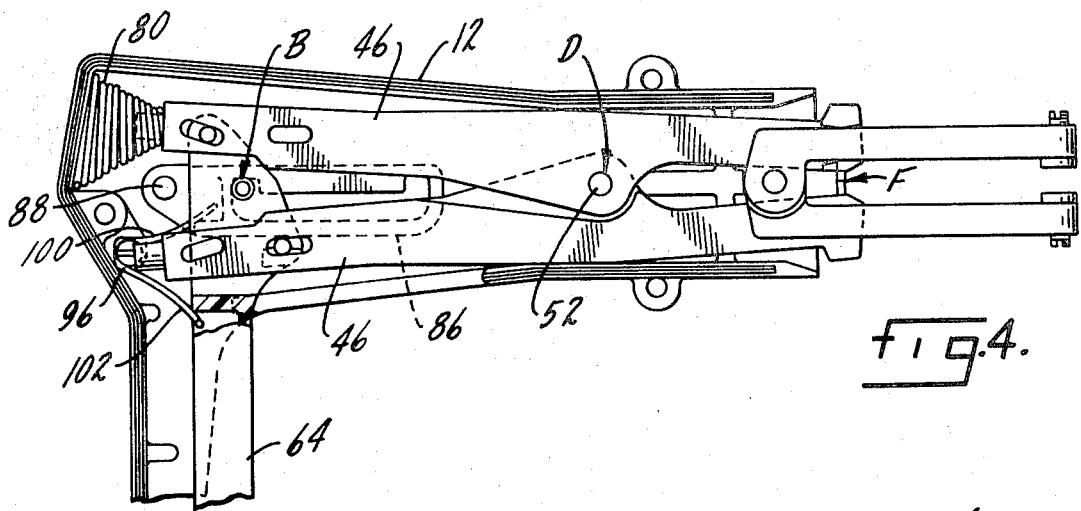
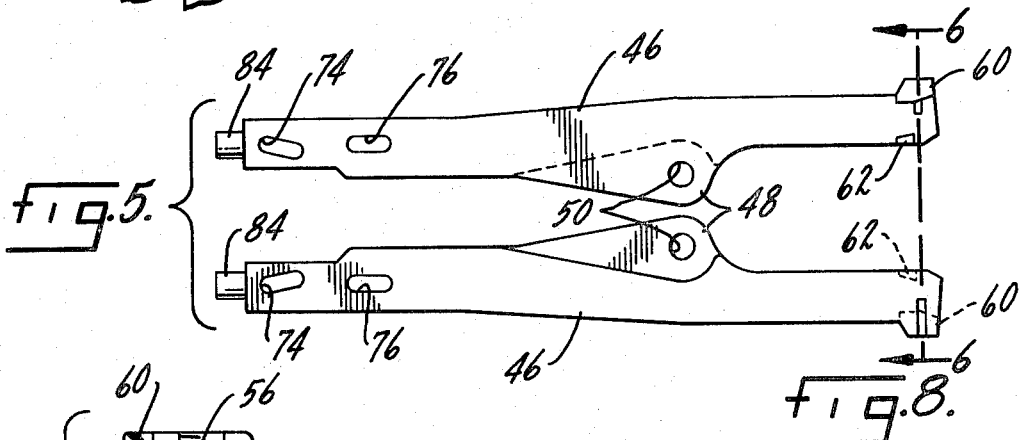
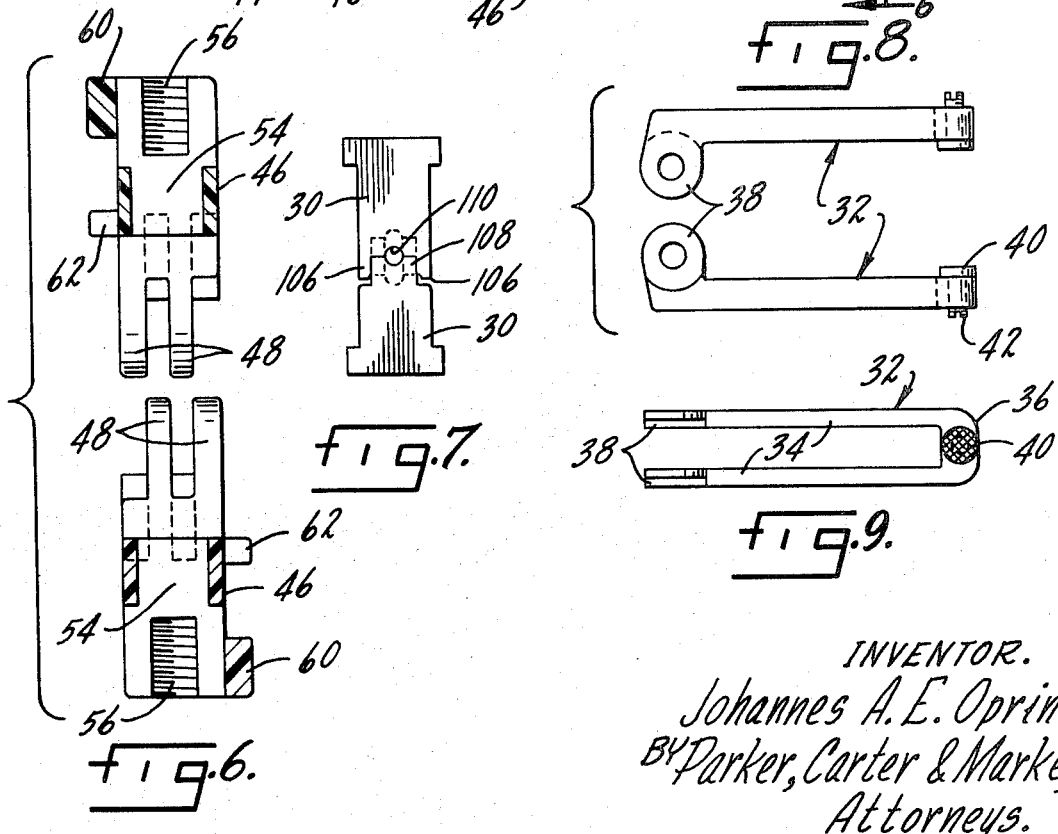
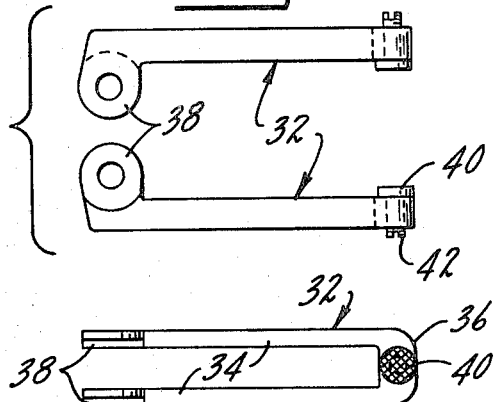

WIRE STRIPPER

SUMMARY OF THE INVENTION

This invention is in the field of wire stripping devices and is concerened with a manually operable wire stripper which removes the insulation from wire in a straight-line motion The primary object is a wire stripper of the so-called pistol-grip type.

Another object is a wire stripper of the above type which has a trigger mechanism that does not spread so far that it will be difficult for the operator, for example a woman, to operate the device with one hand.

Another object is a wire stripper which removes the insulation from the wire in a straight-line motion so that the wire itself will not be arched or flexed or nicked.

Other objects will appear from time to time in the ensuing specification drawings.

BRIEF DESCRIPTION OF THE DRAWINGS

FIG. 1 is a side view, partly in section, with one half of the housing removed;

FIG. 2 is a top view of FIG. 1, partly in section, with some of the parts exploded;

FIG. 3 is like FIG. 1 but a different position;

FIG. 4 is like FIG. 1 but still another position;

FIG. 5 is a side view exploded of the levers for the cutting or stripping blades;

FIG. 6 is a section along line 6-6 of FIG. 5, on an enlarged scale;

FIG. 7 is a front view of the cutting blades, together and removed from the stripper;

FIG. 8 is a side view of the gripper blades and levers removed from the stripper; and FIG. 9 is a top view of one of the levers and jaws of FIG. 8.

BRIEF DESCRIPTION OF THE PREFERRED EMBODIMENT

The stripper includes two housing halves, designated 10 and 12 in FIG. 2 which are held together by a suitable number of nuts and bolts extending through aligned openings in the two halves, as at 14, 16, 18 and 20. The abutting edges, for example, all across the top 22 and down the rear surface 24 and for a portion 26 underneath may have interfitting tongue and groove surfaces so that when the two halves are brought together and the nuts and bolts tightened, the abutting edges will interfit. The two halves may be connected in various ways. For example, the two halves may be ultrasonically welded together after the components have been installed in one half.

Projecting from the front of the housing are certain levers, to be explained in detail hereinafter, which support and provide for the movement of grippers 28 an upper gripper and a lower gripper, and certain cutters or blades 30, also an upper and a lower.

The grippers and their levers are shown in detail in FIGS. 8 and 9. The upper and lower levers and the grippers are the same, so only one will be explained. The lever itself, designated 32, has two spaced generally parallel arms 34 with a crosspiece on the front 36 to support the gripper 28 and trunions 38 on the rear, offset to one side so that two identical levers can be positioned opposite each other, as in FIG. 8, and intermeshed for a common pivot. The crosspiece 36 may carry a gripper pad 40 which is adjustable by a threaded screw 42 or the like with the pad itself having a knurled face, as shown in FIG. 9, for good gripping contact with the outside of the insulation on the wire. When the trunions 38 are intermeshed in position in the housing, they are rotatably supported by stub shafts 44, one on each side projected inwardly from the inner surface of the housing halves. The stubs 44 may be integrally formed in the housing halves and, when the housing halves are fully assembled, the stubs 44 do not contact each other but rather provide a space between them.

Blade holders or levers 46, in FIG. 5, also may be identical so that only one type needs to be made, any two thereafter being matchable. In FIG. 5 the cutting blades themselves have been removed from their holders or levers and will be explained in connection with FIG. 7. Two holders or levers 46 are shown opposite each other and slightly separated and it should be understood that when they are brought together the webs 48, of which there may be two on each holder, intermesh as shown in FIG. 6 so that the pivot openings 50 align. A suitable pivot pin 52, shown in FIG. 2, may be inserted to hold the levers in position. The webs 48 and pivot pin 52 then occupy the space between the stub shafts 44 and, in fact, the pivot pin 52 will be more or less aligned with the stub shafts 44 when the stripper is in its at rest or normal position. The levers 46 then occupy the space between the legs or parts 34 of the levers 32 that carry the grippers.

The front of the blade holders or levers, meaning to the right in FIG. 5, are specially constructed to adjustably hold cutting or stripping blades. A socket or passage 54 is more or less T-shaped to accept a T-shaped blade. A threaded socket on the outside, as in 56 accepts a set screw to hold the blade in place. Considering the upper blade holder or lever 46 for the moment, the blade itself is inserted from above down through the split threaded socket 56 until the lower surface of the blade projects from the inner surface of the lever. The set screw, shown at 58 in FIG. 2, is inserted and tightened. One side of the lever head has offsets, 60 on top and somewhat larger and 62 on the bottom and somewhat smaller with a gap between, as shown in FIG. 6. When two levers are brought together, as shown in FIG. 6, the offsets 60 and 62 of the upper one will be to one side and the lower ones to the other side. The offsets 60 and 62 straddle one of the legs 34 of the gripper lever 32, note this relationship on the upper such levers is shown in FIGS. 1 and 3, for example. As the blade holders or levers are pivoted to close the cutting blades (from the FIG. 1 to the FIG. 3 position) the large upper abutment 60 on each lever will close the gripper levers 32. As the blade holders or levers are pivoted the other way to open the stripping blades, the smaller lower abutments 62 will open the gripper levers. Thus the operation of the blade holders or stripper blade levers not only opens and closes the stripper blade but also controls the opening and closing of the gripper levers and grippers.

A trigger, designated generally 64, is pivotly mounted in the housing and extends through the bottom opening. The pivot is in the form of a pin 66 which extends on each side of the trigger into a slot or channel 68 formed on the inner surface of each of the housing halves. In FIG. 2, pivot pin 66 is shown all the way forward in channel 68, only one channel being shown in FIG. 2. The channels control the movement of the pin between its fully forward position designated "A" in FIGS. 1 and 2 and its full rearward position designated "B" in FIG. 4.

The trigger 64 has pins projecting from one side, an upper one 70 and a lower one 72. The pins may be considered to be on a diameter across pivot 66 or they may be offset somewhat. In any event, the pins project into slots 74 and 76 in the rear ends of the blade holders or levers so that rotation of the trigger 64 from the FIG. 1 to the FIG. 3 psoition will cause the blade holders or levers 46 to spread at their rear ends and close at the front end to bring the grippers into firm contact with the outside of the wire. The dimensioning is such that the gripper pads 40 engage the insulation so that rotary movement of the blade holders stops before the pins 70 and 72 hit the end of their notches, note the slight space in FIG. 3. Thus the load applied to the trigger by the user will be taken by the insulation of the wire.

As the operator squeezes the trigger further, the pivot point 66 moves rearwardly from the FIG. 3 to the FIG. 4 position. This will draw the blade holders or levers rearwardly with the enlargements 60 sliding along the gripper levers 32. The rearward movement of the blade holders compresses a tapered spring 80 which may be mounted against a rear surface or wall 82 with the forward end thereof over a stub 84 on the rear of the upper blade holder. Since both blade holders are alike, the lower blade holders will have a similar stub but it serves no purpose. The same is true of the slots 74 and 76, note the duplicates which serve no function. A latch 86 is pivoted on the inside of one housing half, as at 88, with the pin 66 riding in the slot 90 therein. It will be noted that the slot 90 has risers at each end to provide forward and rear shoulders 92 and 94. A spring 96 may be mounted in the housing, for example by a screw 98, with an upper leg 100 that bears against the latch and the lower leg 102 that is normally free but functions as set forth hereinafter. The trigger has an abutment or projection 104 for a purpose explained hereinafter.

The cutting or stripping blades are shown in detail in FIG. 7 and include overlapping outside portions 106 providing a center slot for center projection 108 on the other. The opposed cutting surfaces may be beveled with a die-type opening 110 in the center for the wire.

The use, operation and functions of the invention are as follows:

When the user applies pressure to the handle or trigger 64 tending to close it toward the fixed handle 24, the trigger will pivot about its pivot pin 66 which is at a position designated "A" in the drawing. This causes the pins 70 and 72 attached to the handle and preferably at an equal distance from the pivot pin 66 to move clockwise. This closes the gripping and cutting jaws, the cutting jaws directly because the blade holders or levers 46 pivot about their pin 52 and the gripping jaws indirectly since the large projection 60 on the blade holders will force them closed. Both the gripping and cutting jaws pivot about the point designated "C." Note that the rear end of the blade holders 46 spread from the FIG. 1 to the FIG. 3 position which closes the front ends and brings the opposed jaws together.

The pivot 66 of the trigger or handle 64 will remain at the "A" position until enough force is applied by the user to overcome the spring tension of spring 80 and also the spring tension of the upper leg 100 of the spring 96 at which time the handle or trigger pivot 66 will force the latch 86 upwardly. The pivot pin 66 cams against the shoulder 92 of the latch and forces the latch up. The pivot pin 66 is then free to move rearwardly in the slot 90 of the latch from point "A" to point "B" in FIG. 4. When the pin arrives opposite the shoulder 94 at the rear end of the slot 90, the upper leg 100 of spring 96 will force the latch plate down. The trigger or handle 64 in the meantime will have contacted the lower leg 102 of spring 96 and will load it slightly, as shown in the FIG. 4 position. The rearward movement of pin 66 is controlled by the channels 68 in the two housing halves. The rearward movement of pivot pin 66 will draw the cutting blades 30 rearwardly, from the FIG. 3 to the FIG. 4 position. The pivot 52 of the blade holders or levers will be moved from the "C" position in FIG. 3, to position "D" in FIG. 4. At the same time the blades will move from position "E" in FIG. 3 to position "F" in FIG. 4. During this movement the large upper projections 60 on the blade holders will slide along the outer surfaces of the gripper levers 32 holding the gripper pads themselves in firm contact with the insulation of the wire. The gripper pads 40 should have been adjusted to the outside diameter of the insulation of the electric wire being stripped and it is important that sufficient friction be maintained between the grippers and the insulation.

The operator then begins to relax the pressure on trigger or lever 64. The pressure of lower spring leg 102 will cause the lever or trigger 64 to pivot counterclockwise about pin 66 and the latch shoulder 94 will hold the pin and lever at point "B" as it pivots. Pins 70 and 72 will move counterclockwise which will open both the gripping and clamping jaws while they are in the FIG. 4 position with pivot pin 66 at point "B." The opening movement of the levers 32 is caused by the small projection 62 on the blade holders. The jaws open sufficiently so that the stripped wire can be removed while the stripping jaws are at point "F."

Continued relaxation on the handle or trigger 64 will cause the projection 104 on the handle to hit the bottom of the latch 86 and raise it somewhat. Abutment 94 will come off of pivot pin 66 thus releasing the trigger or lever 64 and allowing main spring 80 to force it forwardly, from the FIG. 4 to the FIG. 1 position, and pivot 66 will move from position "B" to position "A." The stripping blades 30 will move from position "F" to position "E." During this return travel both gripping jaws and stripping blades are in the open position.

It will be noted that the movement of the stripping blades from position "E" in FIG. 3 to position "F" in FIG. 4 when insulation is being stripped initially is in a straight-line or linear motion so that the wire itself will not be flexed or bent and no nicking or scratching can occur.

While I show and describe the preferred form of my invention, it should be understood that suitable additional modifications, changes, substitutions, alterations may be made.

I claim:

1. In a wire stripper, a frame, a pistol-grip type handle at one end of the frame, a trigger pivotally and slidably mounted in the frame between forward and rearward positions, pairs of opposed clamping and stripping jaws mounted in the frame and each being constructed to perform an opening and closing action so as to grasp wire positioned between them, a linkage connecting the trigger and the pair of stripping jaws causing the opening and closing action of the stripping jaws upon initial actuation of the trigger and causing one pair of jaws to separate from the other pair upon further actuation of the tripper, and overlapping surfaces between the clamping and stripping jaws such that the closing and opening action of the stripping jaws upon actuation of the trigger will cause the clamping jaws to also be closed and opened due to the movement of the striping jaws.

2. The structure of claim 1 further characterized in that the stripping jaws separate from the clamping jaws upon further actuation of the trigger.

3. The structure of claim 1 further characterized in that the pairs of jaws are each pivotly mounted on the frame, the pivot of the clamping jaws being fixed in the frame and the pivot of the stripping jaws being slidable therein.

4. The structure of claim 1 further characterized in that the opening and closing action of the stripping jaws opens and closes the clamping jaws.

5. The structure of claim 1 further characterized in that the trigger is connected to the strippping jaws so that actuation of the trigger opens and closes the stripping jaws.

6. The structure of claim 1 further characterized by and including a spring biasing the said one pair of jaws toward the other at the end of a stripping operation.

7. The structure of claim 6 further characterized by and including a latch to hold the jaws temporarily in their separated positions as each pair opens so that the stripped wire may be removed before the jaws are returned to their initial position.

* * * * *